United States Patent [19]
Holcombe et al.

[11] Patent Number: 5,164,130
[45] Date of Patent: Nov. 17, 1992

[54] METHOD OF SINTERING CERAMIC MATERIALS

[75] Inventors: Cressie E. Holcombe, Knoxville; Norman L. Dykes, Oak Ridge, both of Tenn.

[73] Assignee: Martin Marietta Energy Systems, Inc., Oak Ridge, Tenn.

[21] Appl. No.: 513,339

[22] Filed: Apr. 20, 1990

[51] Int. Cl.$^5$ .................................... C04B 33/32
[52] U.S. Cl. ........................... 264/26; 264/25
[58] Field of Search ............................ 264/26, 25

[56] References Cited

U.S. PATENT DOCUMENTS

| | | |
|---|---|---|
| 3,171,009 | 2/1965 | Scheller et al. |
| 3,404,061 | 10/1968 | Shane et al. |
| 3,585,258 | 11/1965 | Levinson |
| 4,057,702 | 11/1977 | Lacombe-Allard |
| 4,100,386 | 7/1978 | Bardet |
| 4,147,911 | 4/1979 | Nishitani |
| 4,163,140 | 7/1979 | Bardet |
| 4,189,629 | 2/1980 | Kraze |
| 4,307,277 | 12/1981 | Maeda et al. |
| 4,323,745 | 4/1982 | Berggren et al. |
| 4,529,856 | 7/1985 | Meek et al. |
| 4,529,857 | 7/1985 | Meek et al. |
| 4,559,429 | 12/1985 | Holcombe |
| 4,565,669 | 1/1986 | Collins et al. |
| 4,683,363 | 7/1987 | Scovell |
| 4,743,340 | 5/1988 | Wrenn, Jr. et al. |
| 4,757,172 | 7/1988 | Palaith et al. |
| 4,764,102 | 8/1988 | Takahashi |
| 4,767,902 | 8/1988 | Palaith et al. |
| 4,771,153 | 9/1988 | Fukushima et al. |
| 4,772,770 | 9/1988 | Matsui et al. |
| 4,784,686 | 11/1988 | Meek et al. |
| 4,806,718 | 2/1989 | Seaborne et al. |
| 4,808,780 | 2/1989 | Seaborne |
| 4,810,846 | 3/1989 | Holcombe et al. |
| 4,880,578 | 11/1989 | Holcombe et al. |

OTHER PUBLICATIONS

C. E. Holcombe and N. L. Dykes, "High-Temperature Microwave Sintering of Nonoxide Ceramics," *91st Annual Meeting of the American Ceramics Society*, Apr. 25, 1989.

C. E. Holcombe, T. T. Meek, and N. L. Dykes "Unusual Properties of Microwave-Sintered Yttria-2 wt.% Zirconia," *J. Mat'l Sc. Letters*, 7, 881-884 (1988).

C. E. Holcombe, T. T. Meek, and N. L. Dykes "Enhanced Thermal Shock Properties of $Y_2O_3$-2wt.%-$ZrO_2$ Heated Using 2.45 GHz Radiation," *Mat. Res. Soc. Symp. Proc.*, vol. 124, Apr. 5-8 (1988).

W. H. Sutton, "Microwave Processing of Ceramic Materials," *Ceramic Bulletin*, vol. 68, No. 2, 376-286 (1989).

C. E. Holcombe, "New Microwave Coupler Material", *Am. Ceram. Soc. Bulletin*, vol. 62, 1388 (1983).

M. B. Dowell and R. A. Howard, "Tensile and Compressive Properties of Flexible Graphite Foils", *Carbon*, vol. 24, No. 3, 311-323 (1986).

"Grafoil Flexible Graphite", Union Carbide Corporation, CP-5070 Rev. 2 10M Oct. 1985.

*Primary Examiner*—James Derrington
*Attorney, Agent, or Firm*—Ivan L. Ericson; Harold W. Adams

[57] ABSTRACT

A method for sintering ceramic materials is described. A ceramic article is coated with layers of protective coatings such as boron nitride, graphite foil, and niobium. The coated ceramic article is embedded in a container containing refractory metal oxide granules and placed within a microwave oven. The ceramic article is heated by microwave energy to a temperature sufficient to sinter the ceramic article to form a densified ceramic article having a density equal to or greater than 90% of theoretical density.

20 Claims, 2 Drawing Sheets

METHOD OF SINTERING CERAMIC MATERIALS

This invention was made with Government support under contract DE-AC05-84OR21400 awarded by the U.S. Department of Energy to Martin Marietta Energy Systems, Inc. and the Government has certain rights in this Invention.

FIELD OF THE INVENTION

This invention relates to a method of sintering ceramic materials. More particularly, this invention relates to a method of sintering ceramic materials by microwave heating.

BACKGROUND OF THE INVENTION

Boron carbide is an excellent material for applications such as armor plates, drill bits and cutting tools because this material has a melting point of 2450° C., a density 2.52 g/cm$^3$, and very hard refractory characteristics. However, these properties of boron carbide also lessen the use of this material because an expensive furnace is required for heating materials to temperatures greater than 2000° C. and expensive cutting and grinding equipment is required for shaping a hard refractory material of this type into a desired configuration. In addition, long periods of time are required for heating materials of this type to sintering temperatures and maintenance of inert atmospheres are expensive for the long periods of time required for sintering operations.

Boron carbide has been sintered in conventional furnaces at temperatures ranging from 2150° to 2250° C. in an inert atmosphere by adding small amounts of free carbon ranging from 0.5 to 3.5 wt.%. However, long periods of time and expensive furnaces were required for heating the boron carbide to these temperatures and the cost of maintaining an inert atmosphere was significant.

SUMMARY OF THE INVENTION

In accordance with one aspect of the present invention, a new and improved method of sintering a ceramic article comprises the following steps:

Step 1—A ceramic article is provided with a protective coating to form a coated ceramic article.

Step 2—The coated ceramic article is embedded in a container containing refractory metal oxide granules.

Step 3—The container containing the coated ceramic article embedded in the refractory metal oxide granules is heated by microwave energy to a temperature sufficient to sinter the coated ceramic article to form a densified coated ceramic article.

In accordance with another aspect of the present invention, a new and improved method of sintering a ceramic article comprises the following steps:

Step 1—A ceramic article is provided with a protective coating to form a coated ceramic article. The protective coating consists essentially of a first layer of boron nitride covering the ceramic article, a layer of flexible graphite foil covering the first layer of boron nitride, a second layer of boron nitride covering the layer of flexible graphite foil, and a layer of a refractory metal covering the second layer of boron nitride.

Step 2—The coated ceramic article is embedded in a container containing refractory metal oxide granules.

Step 3—The container containing the coated ceramic article embedded in the refractory metal oxide granules is heated by microwave energy to a temperature sufficient to sinter the coated ceramic article to form a densified coated ceramic article.

In accordance with another aspect of the present invention, a new and improved method of sintering a ceramic article comprises the following steps:

Step 1—A ceramic article is provided with a protective coating to form a coated ceramic article. The protective coating consists essentially of a layer of a refractory material covering the ceramic article.

Step 2—The coated ceramic article is embedded in a container containing refractory metal oxide granules.

Step 3—The container containing the coated ceramic article embedded in the refractory metal oxide granules is heated by microwave energy to a temperature sufficient to sinter the coated ceramic article to form a densified coated ceramic article.

Figure 1:
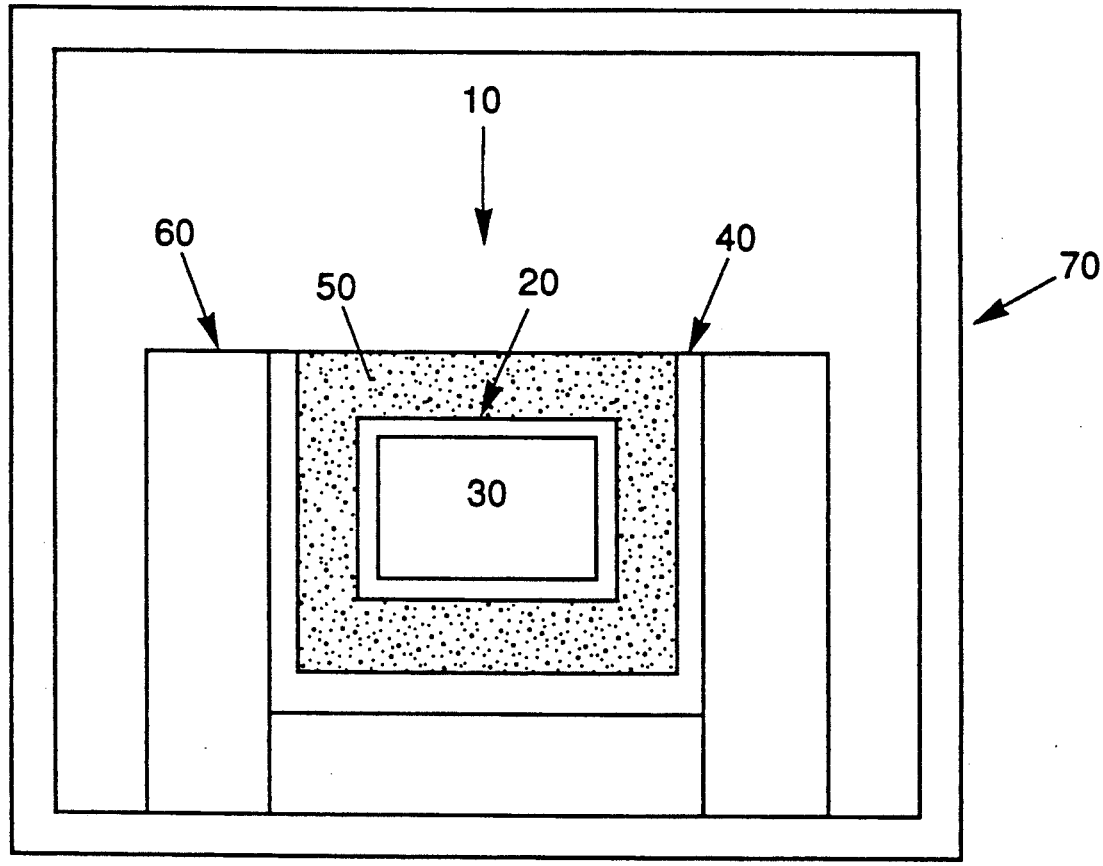
FIG. 1 is a cross-sectional view of a ceramic article coated by a protective coating in accordance with the present invention.

For a better understanding of the present invention, together with other and further objects, advantages and capabilities thereof, reference is made to the following disclosure and appended claims in connection with the above-described drawing.

DETAILED DESCRIPTION OF THE PREFERRED EMBODIMENTS

When microwave processing high-temperature ceramics, such as titanium diboride and boron carbide, it is desirable to produce high-purity dense parts. However, a case is required for insulating the part to be microwave sintered. The case must contain a material that will allow microwaves to pass through and thermally insulate the part being heated. For very-high-temperature sintering (i.e., equal to or greater than 2000° C.) −14 to +100 mesh yttria granules (or 150 to 1400 micron sized grains) are used. While yttria-granules-packing allows the temperatures of 1800° to 2400° C. necessary for sintering refractories to be achieved, there must be a means to prevent the yttria from reacting with the parts being sintered. The yttria will react by direct diffusion into the part as well as by vapor reaction with the part, since at about 2000° C., yttria has a significant vapor pressure. Thus, barriers to the yttria diffusion and vapor penetration into parts being sintered must be utilized. In preparation for experiments in a microwave furnace, boron carbide powder was blended in 3.0 wt.% free carbon, then portions of the blended powder were pressed into solid cylinders having a diameter of 1 inch and a height of 1 inch.

In the experiment, one of these solid cylinders was enclosed in hafnia and placed in a microwave oven equipped with two 0.8-kilowatt magnetrons in which one magnetron was located in the top and the other in the bottom. A microwave frequency of 2.45 GHz was provided by the magnetrons. The microwave furnace was turned to full power and the solid cylinder was heated for 60 minutes, then cooled to ambient conditions.

Examination of the heated solid cylinder indicated that the solid cylinder was sintered only near the surface. It appeared that the hafnia absorbed microwaves and prevented microwave absorption by the solid cylinder of boron carbide and free carbon.

In another experiment, a solid cylinder of boron carbide and free carbon was enclosed in a chamber of yttria granules. The average thickness of granules surrounding the solid cylinder was about 0.75 inch. The assembled chamber was placed in the previously described microwave furnace and surrounded with alumina bricks. Then, the oven was turned to full power and the solid cylinder of boron carbide and free carbon was heated for about 60 minutes and cooled to ambient temperature.

Examination of the cooled solid cylinder indicated the boron carbide and free carbon had been sintered. However, the yttria granules had reacted with the boron and free carbon, and cracks were present in the solid cylinder of boron carbide and free carbon.

In still another experiment, a solid cylinder of boron carbide and free carbon was surrounded in a chamber of niobium powder. The wall thickness of the niobium powder surrounding the solid cylinder was about 0.75 inch. The assembled chamber was placed in the previously described microwave furnace and surrounded with alumina bricks. Then, the furnace was turned to full power and the solid cylinder of boron carbide and free carbon was heated for about 60 minutes. Then the assembled chamber was furnace cooled to ambient temperature, and the solid cylinder was removed from the chamber.

Examination of the solid cylinder indicated that the solid cylinder had retained its basic shape, but the boron carbide and free carbon was only partially sintered. This indicated that the niobium powder had absorbed the microwaves and lessened the availability of microwaves for absorption by the solid cylinder of boron carbide and free carbon. Consequently, the use of niobium powder for thermally insulating the solid cylinder of boron carbide and free carbon was undesirable and another arrangement of components for a case was sought for sintering high-temperature ceramic materials.

An object of the subject invention is to provide a case for enclosing materials in a thermally insulated, chemically nonreactive environment for heating and sintering the enclosed materials with microwaves.

An example of the subject invention is shown in FIG. 1. Thermally insulated case 10 for microwave sintering of high-temperature ceramic materials comprises:

1) coating 20 covering the surface of high-temperature ceramic material 30. Coating 20 consists essentially of a microwave-coupling refractory metal and/or refractory boride selected from the group consisting of molybdenum, niobium tantalum, tungsten, hafnium boride, zirconium boride, titanium boride, yttrium boride, and lanthanum boride for assisting in heating to the high-temperatures.

2) Chamber 40 which has a minimum wall thickness of 0.06 inch contains fused yttria granules 50 having a granular size ranging from 150 to 2000 microns. Fused yttria granules 50 provide a bed having a thickness of about 0.75 inch surrounding the ceramic material 30 having coating 20. Fused yttria granules 50 intimately contact the entire surface of coating 20 of ceramic material 30 thereby providing microwave-noncoupling thermal insulation for retaining the heat produced from microwave absorbance in ceramic material 30; and 3) a microwave-noncoupling array of thermally insulating brick 60 selected form the group consisting of alumina and silica for enclosing chamber 40 forming thermally insulated case 10 inside microwave furnace 70.

In the subject invention, the coating of a refractory material is heated to temperatures over 2000° C. by absorption of microwaves. Consequently, the surface of the high-temperature ceramic material is uniformly heated with the inner regions of the ceramic matreail to provide a crack-free body of ceramic material. Also, the heat transfer from the ceramic material to the thermal insulation of fused yttria granules is lessened; and chemical reactions between the ceramic material and the thermal insulation of the fused yttria granules are prevented. The coating of refractory metal and/or boride functions as a diffusion barrier to prevent the yttria and/or oxygen from diffusing into the heated specimen of ceramic material. Also, the heated specimen of ceramic material is prevented from diffusing into the thermal insulation of yttrium oxide and chemically reacting with it. The coating of refractory metal and/or boride is an essentially element of the subject invention. The prevention of chemical reactions between materials at the sintering temperatures for refractory materials is very difficult and a significant achievement. Chemical interactions are a serious problem in sintering ceramic materials with microwave energy because the specimen of ceramic material must remain in intimate contact with the refractory thermal insulation. As a result, the probability of chemical reaction between the refractory thermal insulation and the specimen of ceramic material is significantly increased by the combination of high temperatures and intimate contact.

In preparation for testing the subject invention, solid cylinders containing 97 wt.% boron carbide and 3 wt.% carbon were prepared by blending boron carbide particulates having an average size of 5 microns with particles of phenolic resin in acetone. The acetone was evaporated, leaving boron carbide particulates coated with phenolic resin. These coated particulates were undirectionally pressed at 10,000 psi into solid cylinders having a 1-inch diameters and height of 1 inch, then the phenolic resin was carbonized at temperatures ranging from 850°-950° C. for 1 hour in an argon atmosphere. A paint for coating the solid cylinders was prepared by blending niobium powder having an average size of 5 microns with an aqueous solution containing 3 wt.% of carboxymethylcellulose and a binder/suspension agent. The paint contained 58 wt.% niobium powder and 42 wt.% of the aqueous solution of carboxymethylcellulose.

In a test of the subject invention, a solid cylinder of the boron carbide and free carbon was painted with the niobium paint to form a coating having a thickness of approximately 0.005 inch. The painted cylinder was placed in a chamber of fused yttria granules having a bed thickness of 0.75 inch between the coated solid cylinder and the inside walls of the chamber. Then the loaded chamber was placed in a microwave oven and enclosed in a thermally insulating array of alumina brick having a minimum wall thickness of 0.5 inch between the outside surface of the chamber and the outer surface of the thermally insulating array of alumina brick to provide a case for almost complete thermal isolation of the cylinder.

The painted solid cylinder of boron carbide and free carbon in the case was heated for 60 minutes in an argon environment at the maximum intensity level of the microwave oven. Then the painted solid cylinder was cooled in the argon environment and removed from the case for examination.

Visual examination indicated that the solid cylinder was free of cracks; and tests indicated that the solid cylinder had been sintered to a density of 2.29 g/cm$^3$, which is 90% of the theoretical density of the cylinder of boron carbide and free carbon. Porosity measurements indicated that the cylinder had a total porosity of 10%.

Titanium diboride with a melting point of 2980° C. and a density of 4.52 g/cm$^3$ can also be sintered in the subject case. This high-temperature ceramic can be used for electrodes in the aluminum industry and for structural material in the aerospace industry.

With titanium diboride, microwave sintering temperatures of 1900° to 2100° C. are needed. At the lower temperature, thin coatings, such as the microwave-coupling refractory metal and/or refractory boride discussed above, are applicable. At the higher temperature, a more-vapor-resistant barrier is required, such as a flexible graphite foil "Grafoil" (a Union Carbide Corporation trademark of an unusual material produced by Union Carbide Corporation which is similar to pyrolytic graphite in foil form). This "Grafoil" was utilized in a wrapping scheme to prevent vapor penetration in parts. Either a single layer of the graphite foil or multiple layers have been used (each layer 0.25 mm thick). The graphite foil layers are "glued" onto a pressed pellet before microwave sintering. The base liquid for the glue is also the same used for making paint coatings as barrier layers:

90.6 g. methylethylketone (or MEK)
9.4 g. of "VINAC" —polyvinyl acetate Grade B-100 from Air Products and Chemicals, Inc.

Figure 2:
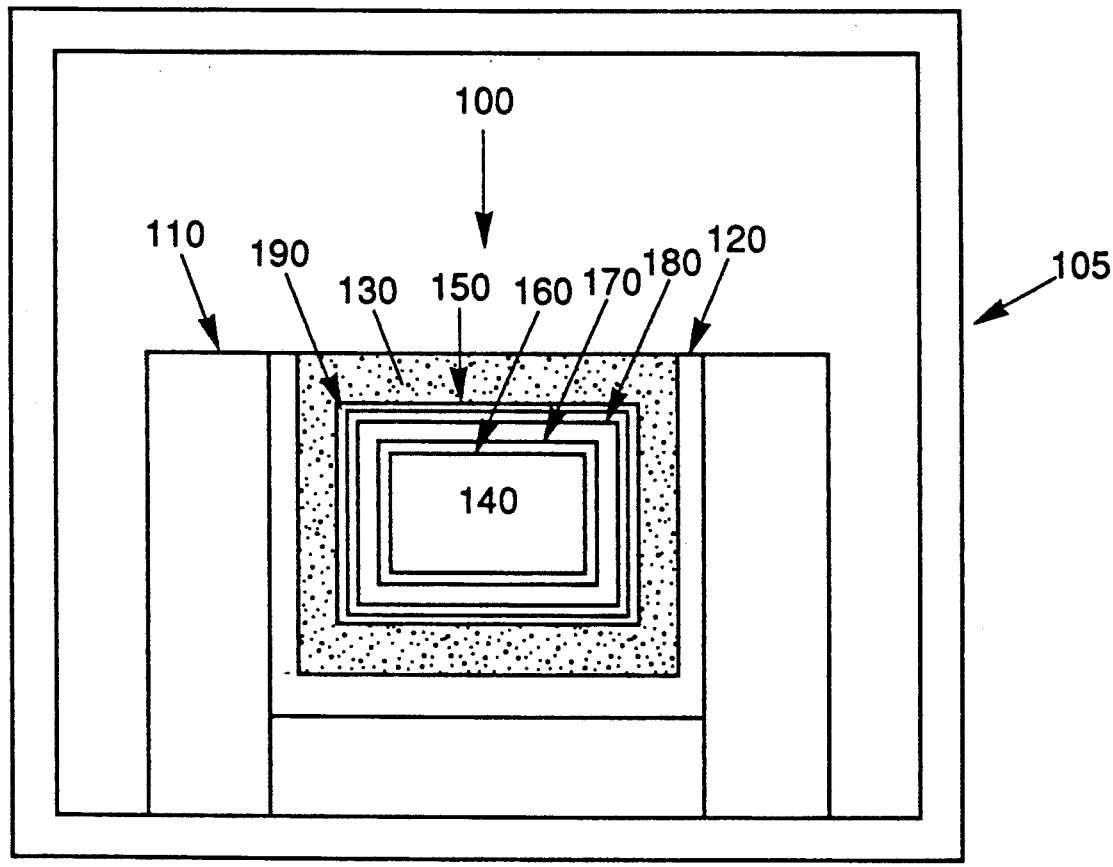
FIG. 2 is a cross-sectional view of a ceramic article coated by layers of protective coatings in accordance with the present invention.

Shown in FIG. 2, is an example of case 100 contained in microwave furnace 105. Case 100 comprises thermally insulating brick 1010 enclosing chamber 120 containing yttria granules 130 in which ceramic sample 140 having protective coating 150 is embedded. Protective coating 150 is utilized for high temperature applications where temperatures equal to or exceed 2100° C. Protective coating 150 comprises boron nitride coating 160, flexible graphite foil layer 170, a second boron nitride coating 180, and niobium or tungsten coating 190.

Ceramic sample 140, such as titanium diboride or boron carbide, is coated with boron nitride forming boron nitride coating 160. A boron nitride coating has been useful to affect separation of the barrier layers after microwaving as well as to reduce any penetration into the pellet samples of titanium diboride or boron carbide. A layer of flexible graphite foil 170 is applied to boron nitride coating 140. Additional layers of flexible graphite foil can be used with our without a boron nitride coating between the layers of flexible graphite foil. Boron nitride does not react with any of the contents of the case, such as $Y_2O_3$, C, $TiB_2$, $B_4C$, but does slowly convert to free boron above 2100° C. in inert atmosphere such as argon. It has been found preferably to coat the outside of the layer of flexible graphite foil (wrapping) with a second boron nitride coating 180 followed by a coating 190 of either niobium paint or tungsten paint. Formulations for coatings 160, 180, and 190 are:

| | |
|---|---|
| BN Coating: | 20 g. BN powder |
| | 100 g. base liquid |
| Nb Coating: | 50 g. Nb powder |
| | 10 g. base liquid |
| W Coating: | 100 g. W powder |
| | 25 g. base liquid |

When temperatures over 2100° C. are needed while using a case containing granular yttria, an outer layer of either Nb paint or W paint is necessary on the outer surface of the graphite foil wrapping. There is a possibility that the metal outer layer reacts with the graphite foil to create a "thermite" reaction (also called self-propagating high-temperature synthesis or SHS reaction) to yield the metal carbide, either NbC or WC. The tungsten paint leads to temperatures of 2200° to 2300° C., whereas the niobium paint outer coating leads to 2400° C. At the same processing temperatures the use of tungsten as the outer coating layer reduces reaction with the pellet being processed as compared to niobium as the outer coating layer.

The metal outer layers were originally added to reduce or prevent the yttria from reacting with the graphite foil; this reaction leads to yttrium carbide, a water-reactive material. Since yttrium oxide vapor is present, there is always some formation of yttrium carbide, as evidenced by the "acetylene-like" odor when the pellet is removed after microwaving. Also, the outer layers will just fall off the pellet with time from the reaction of the yttrium carbide with the moisture in the air.

The painted layers can vary from 0.005 to 0.045 inch (or 0.13 to 1.14 mm) thick. Typically, the boron nitride layer is 0.005 inch thick, whereas a thicker outer layer is preferred (i.e., 0.030 inch). Also a thickness of 0.005 inch (or 0.13 mm) for an additional boron nitride layer 180 between the graphite foil 170 and niobium or tungsten coating 190 is helpful in achieving the highest temperatures. The entire painted/wrapped pellet is often outgassed by heating slowly in a conventional oven, to around 800° C. in argon, before microwaving. Thus, the wrapped pellet can be rapidly heated to >1900° C. without any volatiles from the pellet or its wrappings.

Arcing can occasionally occur when using graphite foil unless some amount of nitrogen is used during the initial microwave heating to around 1000° C. After 1000° C., the atmosphere can be converted to pure argon without any arcing occurring.

Therefore, for high-temperature microwaving of high temperature ceramics, such as titanium diboride or boron carbide, a coating system or a layering system is necessary to prevent yttria contamination from the yttria granules insulation and also to allow the maximum temperatures (necessary for sintering) to be reached.

The subject invention is useful for sintering high temperature ceramic articles, such as armor plates, and other items of high temperature ceramic materials such as drill bits, sintering trays, electrodes and structural components in private and governmental industries.

While there has been shown and described what is at present considered the preferred embodiment of the invention, it will be obvious to those skilled in the art that various changes and modifications may be made therein without departing from the scope of the invention as defined by the appended claims.

What is claimed is:

1. A method of sintering a ceramic article comprising the following steps:
   Step 1—providing a protective coating to a ceramic article to form a coated ceramic article;
   Step 2—embedding said coated ceramic article in a container containing refractory metal oxide granules; and
   Step 3—heating said coated ceramic article embedded within said container containing refractory metal oxide granules by microwave energy to a temperature and for a period of time sufficient to sinter said ceramic article.

2. A method in accordance with claim 1 wherein said protective coating comprising a first layer of boron nitride covering said ceramic article, a layer of flexible graphite foil covering said first layer of boron nitride, a second layer of boron nitride covering said layer of flexible graphite foil, and a layer of a refractory metal covering said second layer of boron nitride.

3. A method in accordance with claim 2 wherein said refractory metal is selected from the group consisting of niobium, tungsten, and mixture thereof.

4. A method in accordance with claim 1 wherein said protective coating consists essentially of a layer of a refractory metal selected from the group consisting of niobium, tungsten, and mixture thereof covering said ceramic article.

5. A method in accordance with claim 1 wherein said ceramic article is a boron carbide article.

6. A method in accordance with claim 5 wherein about 2,100 degrees centigrade.

7. A method in accordance with claim 1 wherein said ceramic article is a titanium diboride article.

8. A method in accordance with claim 7 wherein said temperature of Step 3 is greater than 2,100 degrees centigrade.

9. A method in accordance with claim 2 wherein said temperature of Step 3 is greater than 2,000 degrees centigrade.

10. A method in accordance with claim 1 wherein said refractory metal oxide granules comprise fused yttria granules having a granular-size ranging from about microns to about 2,000 microns.

11. A method in accordance with claim 1 wherein said container comprises a boron nitride case having a minimum wall thickness of 0.06 inches and alumina bricks surrounding said boron nitride case.

12. A method in accordance with claim 1 wherein said period of time in Step 3 is equal to or less than 60 minutes.

13. A method of sintering a ceramic article comprising the following steps:
   Step 1—providing a protective coating to a ceramic article to form a coated ceramic article, said protective coating consisting essentially of a first layer of boron nitride covering said ceramic article, a layer of flexible graphite foil covering said first layer of boron nitride, a second layer of boron nitride covering said layer of flexible graphite foil, and a layer of a refractory metal covering said second layer of boron nitride;
   Step 2—embedding said coated ceramic article in a container containing refractory metal oxide granules; and
   Step 3—heating said coated ceramic article embedded within said container containing refractory metal oxide granules by microwave energy to a temperature and for a period of time sufficient to sinter said ceramic article.

14. A method of preparing a protective coating for a boron carbide article comprising the following steps:
   Step 1—providing a solid cylinder containing 97 wt.% boron carbide and 3 wt.% carbon;
   Step 2—coating said solid cylinder with a paint of niobium to form a coated boron carbide article.
   Step 3—embedding said coated boron carbide article in a container containing refractory metal oxide granules; and
   Step 4—heating said coated boron carbide article embedded within said container containing refractory metal oxide granules by microwave energy to a temperature and for a period of time sufficient to sinter said boron carbide article.

15. A method in accordance with claim 14 wherein said solid cylinder of Step 1 was prepared by blending boron carbide particulates having an average size of 5 microns with particles of phenolic resin in acetone, evaporating said acetone forming boron carbide particulates coated with phenolic resin, undirectionally pressing said coated particulates of boron carbide at 10,000 psi to form a solid cylinder having 1-inch diameters and a height of 1 inch, and carbonizing said phenolic resin at temperatures ranging from 850°–950° C. for a period of about 1 hour in an argon atmosphere.

16. A method in accordance with claim 14 wherein said coating is prepared by blending niobium powder having an average size of 5 microns with an aqueous solution containing 3 wt.% of carboxymethylcellulose and a binder/suspension agent to form a niobium paint, said niobium paint consists essentially of 58 wt.% niobium powder and 42 wt.% of the aqueous solution of carboxymethylcellulose.

17. A method in accordance with claim 14 wherein said temperature of Step 3 is greater than 2,000 degrees centigrade.

18. A method in accordance with claim 14 wherein said refractory metal oxide granules comprise fused yttria granules having a granular size ranging from about 150 microns to about 2,000 microns.

19. A method in accordance with claim 14 wherein said container comprises a boron nitride case having a minimum wall thickness of 0.06 inches and alumina bricks surrounding said boron nitride crucible.

20. A method in accordance with claim 14 wherein said period of time in Step 3 is equal to or less than 60 minutes.

* * * * *